March 30, 1937.  A. H. S. KARLSSON ET AL  2,075,727

MACHINE FOR MAKING AND APPLYING BOTTLE CAPS OR CAPSULES

Filed May 17, 1935  5 Sheets-Sheet 1

March 30, 1937. A. H. S. KARLSSON ET AL 2,075,727
MACHINE FOR MAKING AND APPLYING BOTTLE CAPS OR CAPSULES
Filed May 17, 1935 5 Sheets-Sheet 2
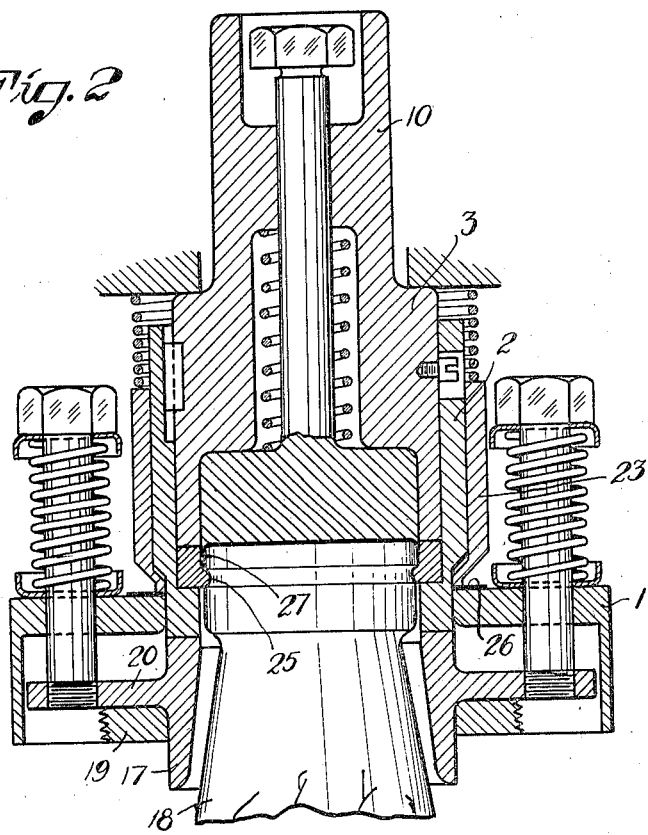
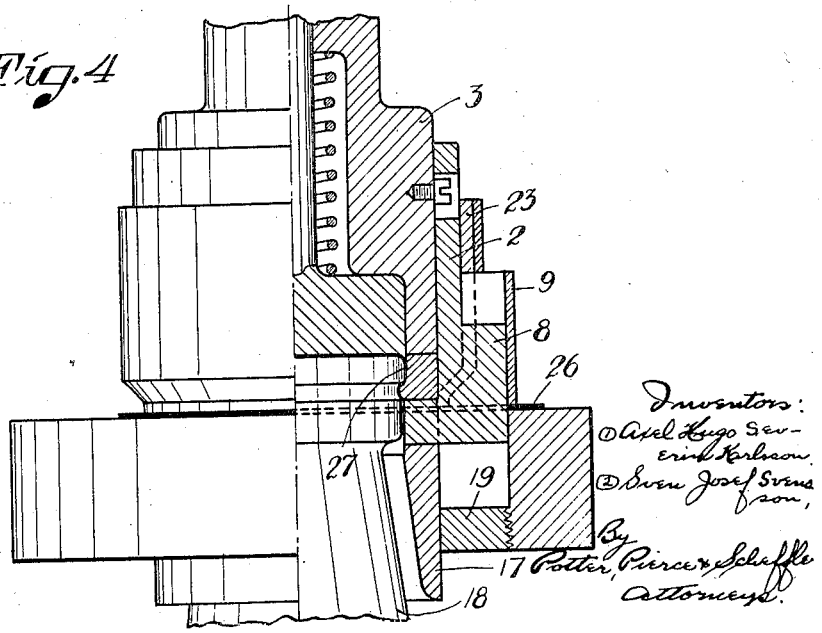

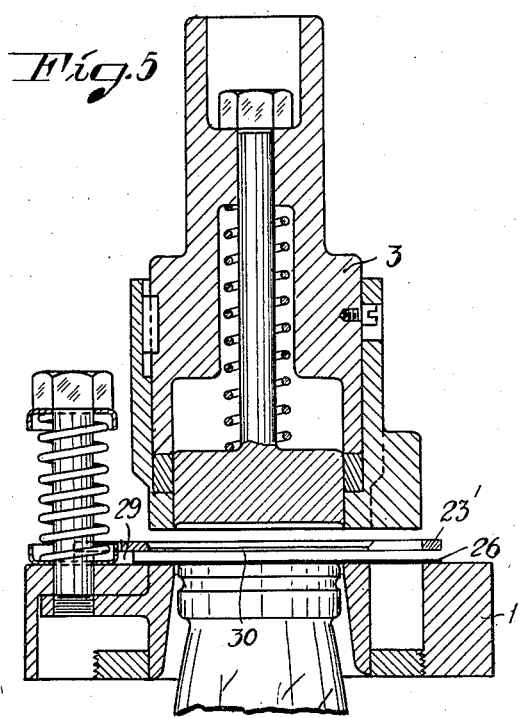
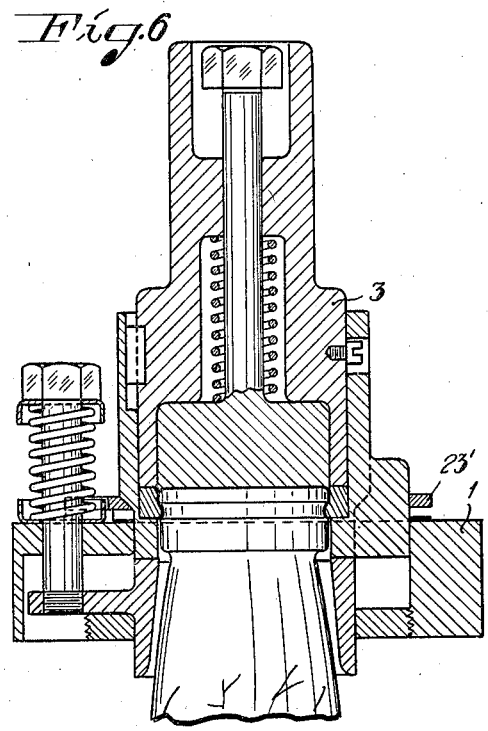
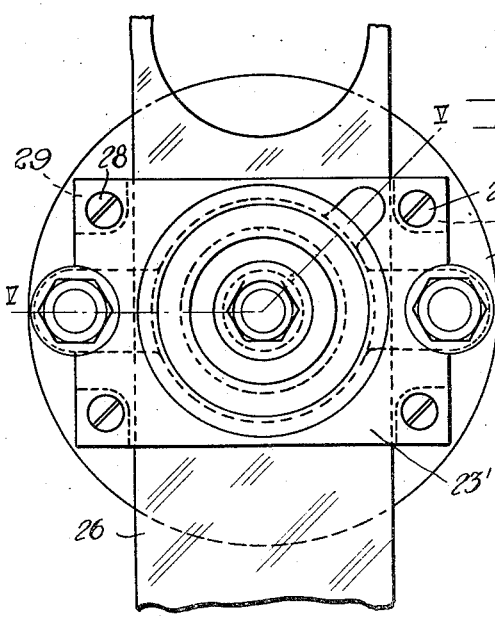

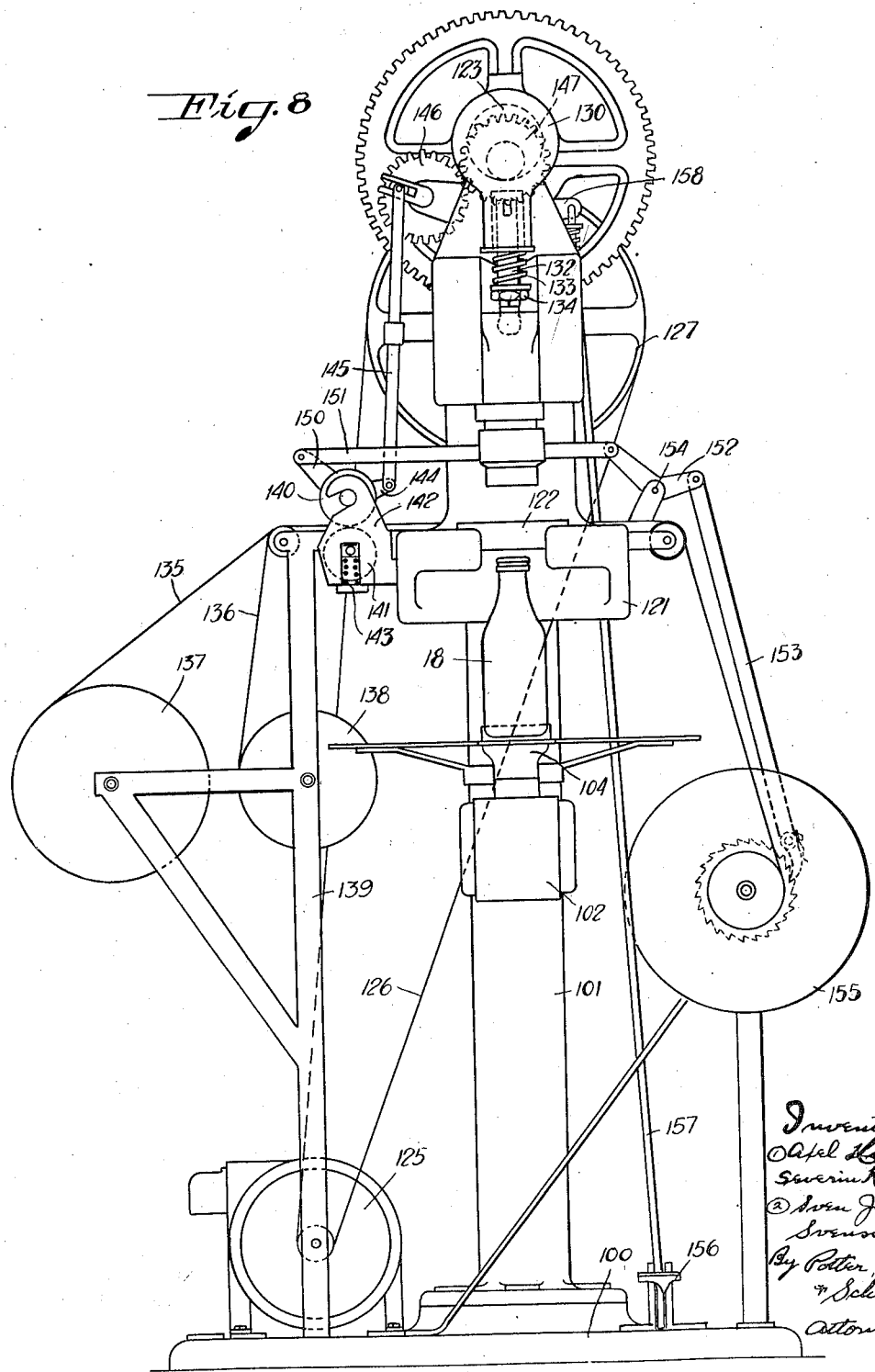

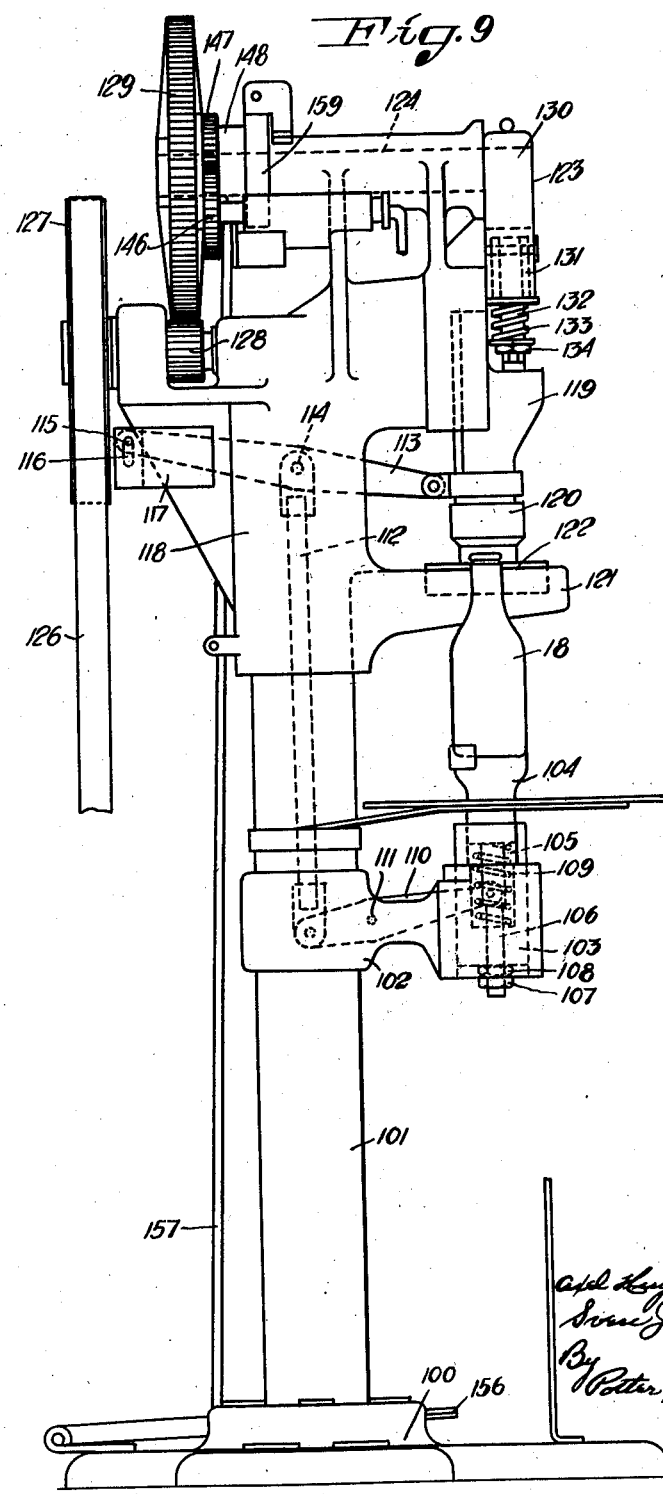

Patented Mar. 30, 1937

2,075,727

UNITED STATES PATENT OFFICE 2,075,727

MACHINE FOR MAKING AND APPLYING BOTTLE CAPS OR CAPSULES

Axel Hugo Severin Karlsson and Sven Josef Svensson, Linkoping, Sweden

Application May 17, 1935, Serial No. 22,080
In Sweden December 29, 1932

5 Claims. (Cl. 226—85)

I have filed an application for patent in Sweden on December 29, 1932, No. 5154/32.

This invention relates to machines for making and applying bottle caps or capsules.

The main object of the invention is to provide a stamping or pressing apparatus for use in machines of the kind referred to, said apparatus being constructed so as to enable mounting and using it in machines of a very simple construction.

A further object of the invention is to provide in said apparatus means for keeping the plate or strip shaped material from which the cap or capsule blank is cut out, in position during the stamping and pressing operation and for preventing said material from obtaining an oblique position and following the stamp during the returning stroke thereof.

A still further object of the invention is to provide a machine of the kind referred to and in which the mentioned stamping or pressing apparatus may preferably be used.

Further objects and advantages of the invention will be clear from the following description of substantially one preferred embodiment of the invention, reference being had to the accompanying drawings in which Figures 1–4 refer to an apparatus having a resilient keeping device, Fig. 1 showing a vertical section through the apparatus according to line I—I of Fig. 3 and having the operative parts in their initial position, Fig. 2 showing the same vertical section but having the parts in the position obtained after applying the capsule, i. e. after cutting and forming it and in the moment in which the capsule has been completely clamped around the neck of the bottle, Fig. 3 being a horizontal view of the apparatus, and Fig. 4 showing the apparatus partly in section on line IV—IV of Fig. 3 and partly in elevation.

Figs. 5–7 refer to a form of the apparatus having a fixed keeping device, Figs. 5 and 6 being sections according to line V—V of Fig. 7 showing the stamp in positions corresponding to Figs. 1 and 2 respectively.

Fig. 7 is a horizontal view corresponding to Fig. 3.

Fig. 8 is a front elevation and Fig. 9 a side elevation of the machine in which the apparatus is used, said figures being diagrammatical in that such details as are self-evident to those skilled in the art and being unnecessary for understanding the operation of the machine are left out.

In the various figures same reference letters indicate same or corresponding parts of the machine and apparatus.

Figure 1:
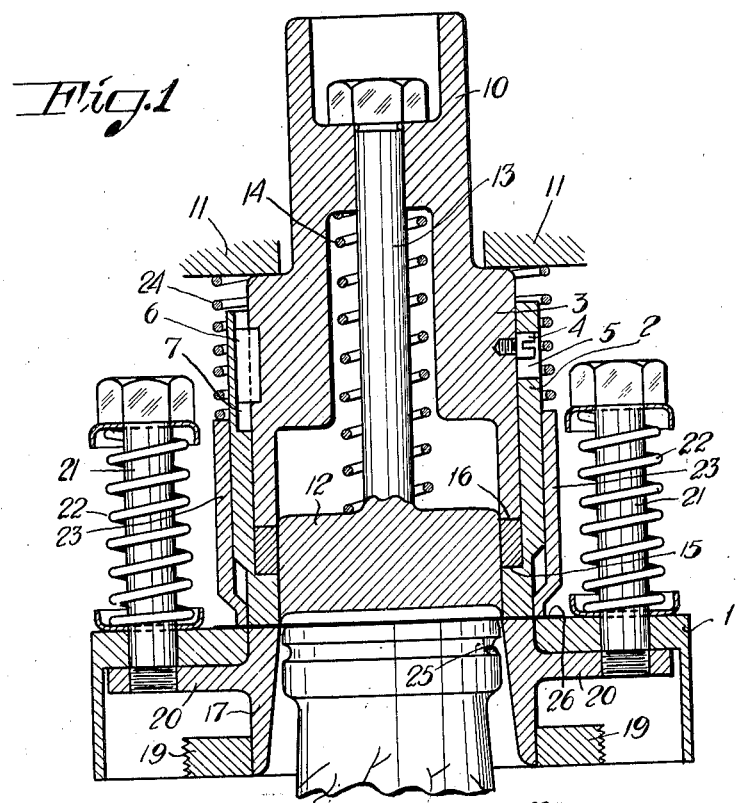

Referring first to Fig. 9, the base 100 of the machine carries a pillar or column 101 guiding a vertically displaceable bracket 102 which carries the supporting means for the bottle 18. Said means consist of a plunger 103 displaceable vertically in a bore in the bracket 102, and of a support 104 carrying the bottle 18 and guided at its bottom in a vertical bore 105 obtained in the plunger 103. Fixed to the bottom of the support 104 is a vertical stem or bolt 106 extending loosely through the bottom of the plunger 103 and having screwed on its outer end two nuts 107, 108 by means of which the pressure of a spring 109 surrounding the stem or bolt 106, and the vertical position of the support 104 may be adjusted so as to accommodate to different bottle lengths. The plunger 103 has a reciprocating movement imparted by a lever 110 pivoted to the bracket 102 at 111. One end of said lever is connected with the plunger 103 and the other end to a link 112 to which another lever 113 is rotatably connected at 114. Said lever is pivoted at one end to a pin 115 which is adapted to be secured in different positions in a notch 116 arranged in a bracket 117 fixed to the frame 118 of the machine. The other end of the lever 113 is connected with a slide 119 adapted to reciprocate vertically in guide-ways in the frame 118. Said slide carries the stamping apparatus 120 which will be described in detail below. The frame 118 has also an integral bracket or table 121 in which a die 122 cooperating with the stamp is mounted. When reciprocating the slide 119 will impart a rocking movement to the lever 113 and a reciprocating movement to the rod 112 and also by means of the lever 110 to the plunger 103. The movement of the slide 119 is obtained by an eccentric disk 123 secured to a shaft 124 which is driven by a motor 125 by way of transmission means 126—129 of suitable construction, as shown in Figs. 8 and 9. The eccentric disk is surrounded by a sleeve 130 having a lower extension 131 guiding therein the upper portion of a plunger 132 the lower end of which is secured to the slide 119. A helical spring 133 surrounding the plunger 132 between the extension 131 and a nut 134 fixed to the plunger 132, which spring is capable of transmitting normal stamping pressures, serves to take up overload arising for instance when bottles having unusually wide necks have been fed into the machine, and because thereof the resistance against the stamping movement have been larger than usual.

The machine also comprises means for feeding the strip or plate shaped material, from which the capsules are cut out, in position to the stamping and pressing apparatus. Said means is broken away in Fig. 9 but are shown diagrammatically in Fig. 8 what will be sufficient to explain the substantial parts and the operation thereof to those skilled in the art.

The material of which the caps or capsules are made may be one single strip of say aluminium or the like, or, as shown in the drawings, it may consist of two strips 135, 136 superpositioned and moved along together. The upper of said strips may be of aluminium or the like and the lower of a suitable packing or tightening material, as for instance cellulosic products such as sold under the trade-mark "Cellophane". The strips are wound on rotatable rolls 137 and 138 carried by a sideframe 139, and are fed forward by the rollers 140 and 141. The shaft of the roller 140 is mounted in a bracket 142 attached to the frame 118, and the shaft of the roller 141 is guided at its end in vertical guide-ways in said bracket 142. The roller 141 is pressed against the roller 140 and the strips therebelow by means of a spring 143. The roller 140 obtains a stepwise rotational movement by a linkage 144, 145 connected to and driven by a gear wheel 146 which is in turn driven by a gear wheel 147 adapted to be connected to the driving wheel 129 on the shaft 124 by means of a clutch 148 (Fig. 9) when the strips are to be fed forward. The upper end of the rod 145 of the linkage may be set in different radial positions on the gear wheel 146 in order to adjust the feeding movement. Movable together with the link or arm 144 is an arm 150, which imparts a rocking movement to a linkage 151, 152, 153 pivoted to the frame of the machine at 154 and driving for instance by means of a ratchet and pawl connection a roll 155, at which the waste material of strip coming from the stamping apparatus is collected.

The machine is operated by means of a pedal 156 connected by a rod 157 to the clutch lever 158 of the clutch 148. The clutch 148 is so constructed and adapted to cooperate with a brake 159 mounted adjacent thereto on the shaft 124 as shown diagrammatically in Fig. 9 that when the pedal 156 is depressed, the shaft 124 is coupled to the driving wheel 129 for exactly one revolution whereupon the shaft will be retarded by the brake and stopped. In stopping, however, the shaft establishes by means of the clutch a driving connection between the wheel 147 and the driving wheel 129 for a further revolution which will result in one feeding step imparted to the strips 135, 137 by the rollers 140, 141. The detailed construction of the clutch 148, the brake 159 and the parts cooperating therewith is no part of this invention and will not be described in this connection.

When the shaft 124 is rotated one turn, the slide 119 moves downward and upward and all the operations for stamping the capsule and applying it on the bottle takes place. This operation will be described below in connection with the detail description of the stamping apparatus proper, shown in Figs. 1–7 inclusive. In this connection it may only be set forth that the bottle 18 is shown in Fig. 8 in its lower position before the stamping operation, Fig. 9 showing the bottle in its top position during the capsule applying operation.

Figure 3:
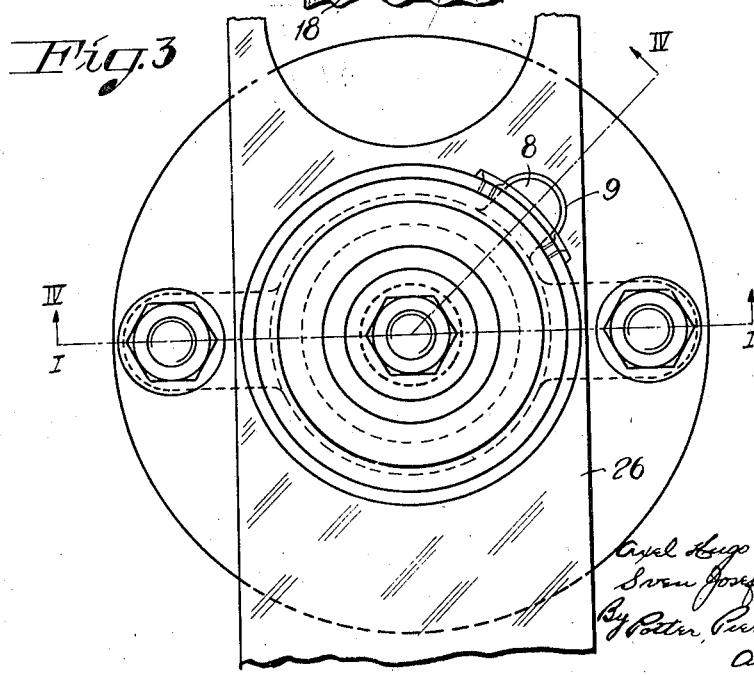

Referring now to Figs. 1–4 inclusive, 1 indicates the part of the pressing die 122 fixed to the table 121. The stamp cooperating with the die consists of two parts 2 and 3, the part 3 of which being displaceable within certain limits in the part 2. The displacement may be limited by a pin or screw 4 secured to the part 3 and movable in a notch 5 in the part 2. Rotational movement of the parts relatively to each other is prevented by the wedge 6 which is displaceable in the notch 7 of the part 2. The stamp part 2 comprises a projection 8 surrounded by a mounting or clamp 9 secured to the keeping device described below (Figs. 3 and 4). The projection 8 cuts out that lap of the capsule by means of which the capsule is adapted to be pulled or torn off in a well-known manner, when the bottle closed by the capsule is to be opened. The top part 10 of the stamp is adapted to be secured to a reciprocating member 11 of the machine, as for instance the slide 119 shown in Fig. 9. The portion 11 being only shown fragmentarily serves as an abutment for the stamp part 3. Displaceable upward and downward in the stamp part 3 is a plunger 12 guided by the rod 13 and forced downwards by the spring 14. Between the bottom of the stamp part 3 and a shoulder 15 in the part 2 is inserted an annulus 16 of India rubber or other elastic or resilient material forming by its inner side a portion of the inner wall of that cavity of the stamp part 3, in which the plunger 12 is adapted to reciprocate. It is to be noted that when the parts are in the position shown in Fig. 1 the elastic annulus 16 is confined within solid walls in all directions so that it is capable of transmitting pressure without being deformed.

A guiding sleeve 17 in which the neck of the bottle 18 may be introduced from below is displaceable upward and downward within a stationary guide 19 fixed to the die 1, and has at the outer surface thereof two projections 20 extending at opposite sides and carrying two vertical guide bolts 21 displaceable vertically in openings in the die 1 and forced upwards by springs 22. The device keeping the strip to be stamped consists of a sleeve 23 surrounding the stamp part 2 and adapted to abut against the upper surface of the plate or strip of which the capsule is cut out, for the purpose of keeping the plate or strip in position as the stamping proceeds and prevent it from following the stamp upwards as it moves in said direction to be ready for cutting again. The keeping device is actuated from above by the spring 24 inserted between the part 11 and the top edge of the keeping device or sleeve.

The apparatus according to the form of construction now described operates and is used in the following manner.

A strip-shaped material being indicated in the detail figures as a single plate 26 is fed between the die 1 and the stamp part 2. The neck of the bottle to be furnished with the capsule is introduced from below into the sleeve 17 and is placed on the support 104 (Figs. 8 and 9). As the member 11 imparts the initial movement to the stamp member 3, the same motion is transmitted to the stamp member 2, and the outer edge of stamp member 2 cuts out the capsule blank from the strip. At the same time the plunger 12 will move upwards in the inner of the stamp part 3, the plunger being actuated by the bottle which is forced upward at the same time. The cut-out disk 27 is now positioned so as to have its central portion between the stamp 12 and the mouth of the bottle and its rim portion between the stamp member 2 and the sleeve 17. When the inner edge of the stamp member 2 proceeds downwards along the neck of the bottle, the rim portion of the disk will be bent down so that the capsule will be formed.

The keeping device or sleeve 23 the lower end of which has been abutting against the upper surface of the die 1 before introducing the strip 26 under the stamp, is elevated to some extent, either manually or automatically by means not shown as the strip is to be introduced whereby the spring 24 is compressed somewhat. As the stamp is moving downwards, the spring will be compressed further so as to force the sleeve against the surface of the strip. Since the sleeve surrounds the stamp and accommodates thereto accurately, as shown in the drawings, the pressure from the sleeve will be exerted directly at the contour after which the blank of capsule is cut what assists in obtaining a good stamping operation. At the upward movement mentioned above the plunger 12 covers the inner side of the resilient annulus 16 so as to confine it, whereby it is prevented from expanding in any direction and because thereof acts as a solid connection transmitting the stamping power between the stamp members 2 and 3 which will move downwards simultaneously through the same distance. On the other hand, as the plunger 12 has proceeded to such an extent in its upward movement as shown in Fig. 2, i. e. to a position so as to uncover the resilient annulus 16, the stamp member 3 continuing downwards will act so as to compress the annulus 16 whereby the annulus will expand as shown in Fig. 2 and force the rim portion of the capsule inwardly into a channel 25 provided in the neck of the bottle. The bottle is now closed by the capsule. As the stamp moves upward again, the annulus 16 will be discharged and obtain its original form so that the stamp 12 is free to move downwards under the action of the spring 14. The bottle is lowered at the same time and when the stamp has completed its returning movement upwards, the bottle is permitted to be removed together with the capsule fixed thereon. In the upward movement of the sleeve 23 the lower side thereof exerts a resilient pressure against the strip 26 so that said strip is prevented from obtaining an oblique position and following the stamp upwards due to the clamping action or friction produced between the edge of the opening formed in the strip and the stamp, and is kept close to the upper surface of the die ready to the next stamping operation after renewed feeding.

The keeping device may be constructed otherwise than now described. As shown in Figs. 5–7 the keeping device may consist of a disk 23' fixed to and parallel with the upper surface of the die 1 to which it is secured by means of screws 28 passing through washers 29 forming a space between the disk and the die to be passed by the strip or plate 26 fed on the die. The disk is provided with an opening accommodating to the stamp which reciprocates therethrough. As the stamp moves upward the strip or plate having been cut out abuts against the keeping disk whereby the strip is released from the stamp and is free to be fed in position for the next stamping operation.

It is to be understood that the invention is not limited to the embodiments or details shown and described since a great many of variations are possible without departing from the spirit of the invention.

A particular advantage of the stamping and pressing apparatus described is the fact that it may be arranged in a plurality of various excenter presses of a conventional type without using any additional means.

What we claim is:—

1. In a machine for cutting blanks and forming the same into caps upon bottles, the combination of a die, and means for feeding a metal strip of cap-forming material over the upper surface of the die, of cutting and forming means operable in a single operation to cut the blank from the strip and to form and apply the cap to the bottle end and neck; said cutting and forming means comprising a stamp member having a cutting edge cooperating with said die to shear the blank from the strip, a second stamp member, an elastic annulus between said members and confined on one side by one of said members, means for applying pressure to one of said stamp members to actuate both stamp members during the cutting and forming operations, a plunger within said members to prevent deformation of the elastic annulus during the cutting and forming of the blank, and means for stripping the stamping members from the strip of material after a cap has been formed and applied to a bottle.

2. A machine as claimed in claim 1, wherein said stripping means comprises a sleeve positioned about and closely fitting the first stamp member, and a helical spring surrounding the first stamp member for forcing the sleeve towards the strip of material.

3. In a machine for cutting blanks and forming the same into caps upon bottles, the combination with a die and means for feeding a metal strip of cap-forming material over the upper surface of the die, of a pair of coaxial stamp members and an elastic annulus between the same, means for applying pressure to one of said members to move both members through a blank cutting and forming operation, the outer of said members having a cutting edge cooperating with said die, means confining the elastic annulus against deformation during the cutting and initial forming operation, and means for maintaining the strip of material in position during the cutting and forming operation.

4. A machine as claimed in claim 3, wherein said strip-positioning means is a sleeve and a helical spring surrounding the outer stamp member.

5. A machine as claimed in claim 3, wherein said annulus confining means is a spring pressed plunger within the inner stamp member.

AXEL HUGO SEVERIN KARLSSON.
SVEN JOSEF SVENSSON.